(12) United States Patent
Oh et al.

(10) Patent No.: US 11,095,206 B2
(45) Date of Patent: Aug. 17, 2021

(54) AC-DC CONVERTER WITH BOOST FRONT END HAVING FLAT CURRENT AND ACTIVE BLANKING CONTROL

(71) Applicant: Apple Inc., Cupertino, CA (US)

(72) Inventors: InHwan Oh, Cupertino, CA (US); Bharat K. Patel, San Jose, CA (US); Abby Cherian, Fremont, CA (US)

(73) Assignee: Apple Inc., Cupertino, CA (US)

( * ) Notice: Subject to any disclaimer, the term of this patent is extended or adjusted under 35 U.S.C. 154(b) by 26 days.

(21) Appl. No.: 16/586,588

(22) Filed: Sep. 27, 2019

(65) Prior Publication Data
US 2021/0099076 A1    Apr. 1, 2021

(51) Int. Cl.
| | |
|---|---|
| H02M 1/44 | (2007.01) |
| H02M 1/42 | (2007.01) |
| H02M 3/335 | (2006.01) |
| H02M 1/08 | (2006.01) |
| H02M 1/00 | (2006.01) |
| H02M 7/06 | (2006.01) |

(52) U.S. Cl.
CPC ......... *H02M 1/4225* (2013.01); *H02M 1/083* (2013.01); *H02M 3/33569* (2013.01); *H02M 1/44* (2013.01); *H02M 7/06* (2013.01); *H02M 2001/007* (2013.01)

(58) Field of Classification Search
CPC .. H02M 1/4225; H02M 1/083; H02M 3/3356; H02M 1/44; H02M 7/06; H02M 2001/007
See application file for complete search history.

(56) References Cited

U.S. PATENT DOCUMENTS

| | | | |
|---|---|---|---|
| 10,170,974 B1 * | 1/2019 | Oh ........................ | H02M 1/083 |
| 2010/0225240 A1 * | 9/2010 | Shearer ................ | H05B 47/185 |
| | | | 315/247 |
| 2014/0119077 A1 * | 5/2014 | Walters .................. | H02M 7/06 |
| | | | 363/89 |
| 2014/0160805 A1 * | 6/2014 | Oh ...................... | H02M 1/4241 |
| | | | 363/21.02 |
| 2016/0072392 A1 * | 3/2016 | Soares ............... | H02M 3/33569 |
| | | | 363/21.02 |
| 2020/0235677 A1 * | 7/2020 | Kataoka ............... | H02M 7/5395 |

* cited by examiner

*Primary Examiner* — Adolf D Berhane
(74) *Attorney, Agent, or Firm* — Blank Rome LLP (57) ABSTRACT

A power converter can include an input boost converter stage having an input configured to receive a rectified AC input voltage and an output configured to deliver a DC bus voltage and a second switching converter stage having an input configured to receive the DC bus voltage and an output configured to deliver a regulated output voltage. The input boost converter may be configured to be operated in a flat current mode to maintain a substantially constant DC bus voltage over a broad range of AC input voltages. The input boost converter may be further configured to be operated in an active blanking mode, wherein operation of the boost converter is prevented during a controlled blanking interval of each cycle of the rectified AC input voltage. The controlled blanking interval may be increased responsive at least in part to an increase in the AC input voltage and/or may be decreased responsive at least in part to a decrease in the AC input voltage.

25 Claims, 7 Drawing Sheets

AC-DC CONVERTER WITH BOOST FRONT END HAVING FLAT CURRENT AND ACTIVE BLANKING CONTROL

BACKGROUND

Recently much effort has been put into increasing power density for AC-DC power supplies. Many of these efforts have focused on a topology employing a flyback converter with an input stage made up of a diode bridge and a relatively large DC bulk capacitor. In many embodiments, the largest components in such an AC-DC converter would be the DC bulk capacitor and the flyback transformer. This topology is especially common for power ratings less than 70 W, where power factor correction ("PFC") is generally not required.

One drawback of this topology arises in multi-voltage power supplies, which may in some instances be designed to accept an input AC voltage varying from 90V to 265V. During the intervals surrounding the zero crossings, the converter may rely on the DC bus voltage to deliver power to the load because the input voltage (nearly zero) may be insufficient to power the load. At low line input voltages, the DC bus voltage (i.e., the rectified voltage across the capacitor) may become very low. To store sufficient energy to power the load during these intervals, the capacitor may have a relatively large capacitance value. Alternatively, at high line input voltages, the rectified peak voltage appearing across the capacitor can be quite high, e.g., 375V peak for a 265V RMS input voltage. As a consequence, the voltage rating of the capacitor must be high enough to accept this voltage. In many cases, 400V or higher rated capacitors may be used.

The energy stored in the capacitor is given by:

$$E = \tfrac{1}{2} C V^2$$

where E is the energy stored in the capacitor, C is the capacitance value of the capacitor, and V is the voltage across the capacitor. If the converter is working with the minimum DC voltage (e.g., Vdc=70V, which would be a typical design value for a 90V input voltage), the fraction of the capacitor's energy storage capacity that is used is very small. This results in suboptimal utilization of the capacitor, particularly when the physical size of the capacitor is taken into account. Additionally, the flyback transformer turns ratio may be selected so that the output may be properly regulated when the converter is operating over the expected range of DC voltage levels. As a result, the main transformer may need a very large design margin so as to work with a DC bus voltage variation ranging from, e.g., 70V (corresponding to a 90-100V AC input) to a maximum DC voltage of 375V (corresponding to a ~265V AC input). This results in suboptimal utilization of the transformer in many operating regimes as well as requiring an excessive switching frequency or duty cycle for at least some operating conditions.

Thus, what is needed in the art is an improved converter design that can maintain suitable output voltage regulation over a wide range of input voltages while improving the utilization of the energy storage components, thereby allowing for increased power density.

SUMMARY

A power converter can include an input boost converter stage having an input configured to receive a rectified AC input voltage and an output configured to deliver a DC bus voltage and a second switching converter stage having an input configured to receive the DC bus voltage and an output configured to deliver a regulated output voltage. The input boost converter may be configured to be operated in a flat current mode to maintain a substantially constant DC bus voltage over a broad range of AC input voltages. The input boost converter may be further configured to be operated in an active blanking mode, wherein operation of the boost converter is prevented during a controlled blanking interval of each cycle of the rectified AC input voltage. The controlled blanking interval may be increased responsive at least in part to an increase in the AC input voltage and/or may be decreased responsive at least in part to a decrease in the AC input voltage.

A flat current corresponding to the flat current mode may be determined responsive at least in part the DC bus voltage and a current flowing through an inductor of the boost converter. The second switching converter may be a flyback converter, including a primary resonant flyback converter. The broad range of AC input voltages may span from a low line voltage to a high line voltage that is approximately three times a low line voltage. For example, the broad range of AC input voltages may be from about 90V to about 265V.

In other embodiments, a power converter may include a boost converter front end configured to convert a rectified AC input voltage into a DC bus voltage. The power converter may further include a first control loop coupled to the boost converter front end and configured to operate a switch of the boost converter to maintain a flat inductor current through the boost converter and a substantially constant DC bus voltage over a range of AC input voltages. The power converter may further include a second switching converter stage having an input configured to receive the DC bus voltage and an output configured to deliver a regulated output voltage. The power converter may further include a second control loop coupled to and configured to operate the second switching converter stage.

The first control loop can include a controller configured to receive an error signal corresponding to a difference between the DC bus voltage and a voltage reference and to generate a flat current command responsive thereto. The controller may be a PID controller. The first control loop may include a comparator configured to compare the flat current command to an inductor current of the boost converter front end and a zero crossing detector configured to detect a zero of the boost inductor current. The zero crossing detector may be configured to turn on a switch of the boost converter front end, and the comparator may be configured to turn off the switch of the boost converter end. The first control loop may include a controller configured to selectively enable switching of the boost converter switch responsive to the rectified AC input voltage. The controller configured to selectively enable switching of the boost converter may be configured to compare the rectified AC input voltage to a ramp signal.

The first control loop may be implemented using any combination of analog circuitry, digital circuitry, hybrid analog-digital circuitry, programmed controllers, application specific integrated circuits (ASICs), and the like.

The broad range of AC input voltages may span from a low line voltage to a high line voltage that is approximately three times a low line voltage. For example, the broad range of AC input voltages may be from about 90V to about 265V.

A method of converting an AC input voltage into a regulated DC voltage can include receiving the AC input voltage, rectifying the AC input voltage into a rectified AC input voltage, using a first switching converter stage to convert the rectified AC input voltage into a DC bus voltage that is substantially constant over a broad range of AC input voltages, and using a second switching converter stage to convert the DC bus voltage to the regulated output voltage. The broad range of AC input voltages may span from a low line voltage to a high line voltage that is approximately three times a low line voltage. For example, the broad range of AC input voltages may be from about 90V to about 265V. The first switching converter stage may be a boost converter operated in a flat current mode, and may employ active blanking.

DETAILED DESCRIPTION

In the following description, for purposes of explanation, numerous specific details are set forth to provide a thorough understanding of the disclosed concepts. As part of this description, some of this disclosure's drawings represent structures and devices in block diagram form for sake of simplicity. In the interest of clarity, not all features of an actual implementation are described in this disclosure. Moreover, the language used in this disclosure has been selected for readability and instructional purposes, has not been selected to delineate or circumscribe the disclosed subject matter. Rather the appended claims are intended for such purpose.

Various embodiments of the disclosed concepts are illustrated by way of example and not by way of limitation in the accompanying drawings in which like references indicate similar elements. For simplicity and clarity of illustration, where appropriate, reference numerals have been repeated among the different figures to indicate corresponding or analogous elements. In addition, numerous specific details are set forth in order to provide a thorough understanding of the implementations described herein. In other instances, methods, procedures and components have not been described in detail so as not to obscure the related relevant function being described. References to "an," "one," or "another" embodiment in this disclosure are not necessarily to the same or different embodiment, and they mean at least one. A given figure may be used to illustrate the features of more than one embodiment, or more than one species of the disclosure, and not all elements in the figure may be required for a given embodiment or species. A reference number, when provided in a given drawing, refers to the same element throughout the several drawings, though it may not be repeated in every drawing. The drawings are not to scale unless otherwise indicated, and the proportions of certain parts may be exaggerated to better illustrate details and features of the present disclosure.

Disclosed herein is a flat-current, active-blanking (FCAB) boost front end AC-DC converter that addresses some of the needs discussed above. In the FCAB boost front end AC-DC converter, the rectified DC voltage may be boosted with a FCAB boost stage (discussed in greater detail below). This boosting operation results in a relatively small variation of the DC bus voltage over a wide range of input voltages. This small DC bus voltage variation can allow for a relatively smaller DC bulk capacitor (versus prior art converter topologies) that is still able to store sufficient energy over the entire input voltage range. The DC bulk capacitor may have a smaller physical size because of its relatively smaller capacitance value. Additionally, a narrower range of DC bus voltages over the operating range can also allow for transformer design optimizations that also allow for reduced size. As a result, overall power density may be significantly increased over prior art converter topologies.

Figure 1:
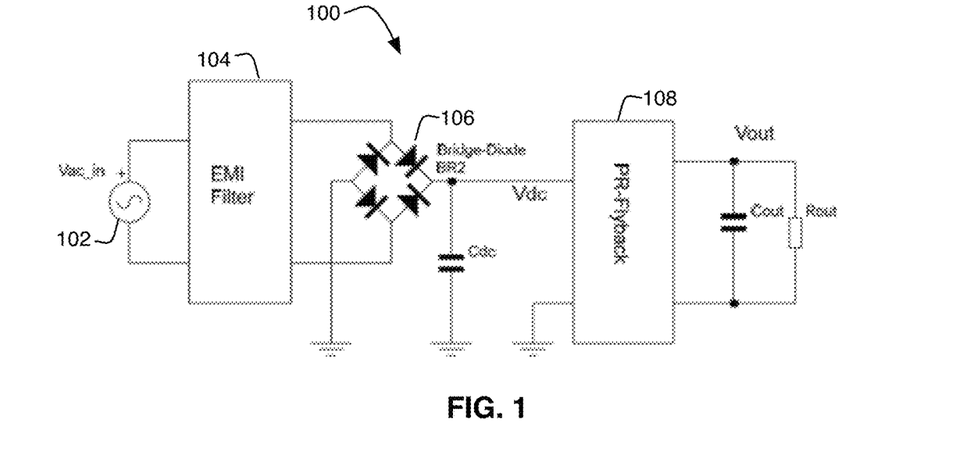
FIG. 1 depicts an AC-DC converter.

FIG. 1 illustrates a diode bridge and DC bulk capacitor based AC-DC power converter 100. An AC input voltage source 102 may be coupled to an electromagnetic interference (EMI) filter 104. The filtered AC input voltage may be coupled to a diode bridge 106, which produces a full wave rectified sinusoidal output. This full wave rectified sinusoidal voltage may be applied to a DC bulk capacitor Cdc, which acts as a DC voltage bus Vdc that serves as the input to a flyback converter 108. Flyback converter stage 108 may be of a variety of designs, including discontinuous conduction mode (DCM) or continuous conduction mode (CCM) flyback converters, as well as a primary resonant (PR) flyback converter. The various flyback converter designs and their associated control schemes are known in the art, and thus will not be repeated in detail herein. Flyback converter stage 108 may generate an output voltage Vout that is supplied across an output filter capacitor Cout and delivered to a load represented by Rout.

Figure 2A:
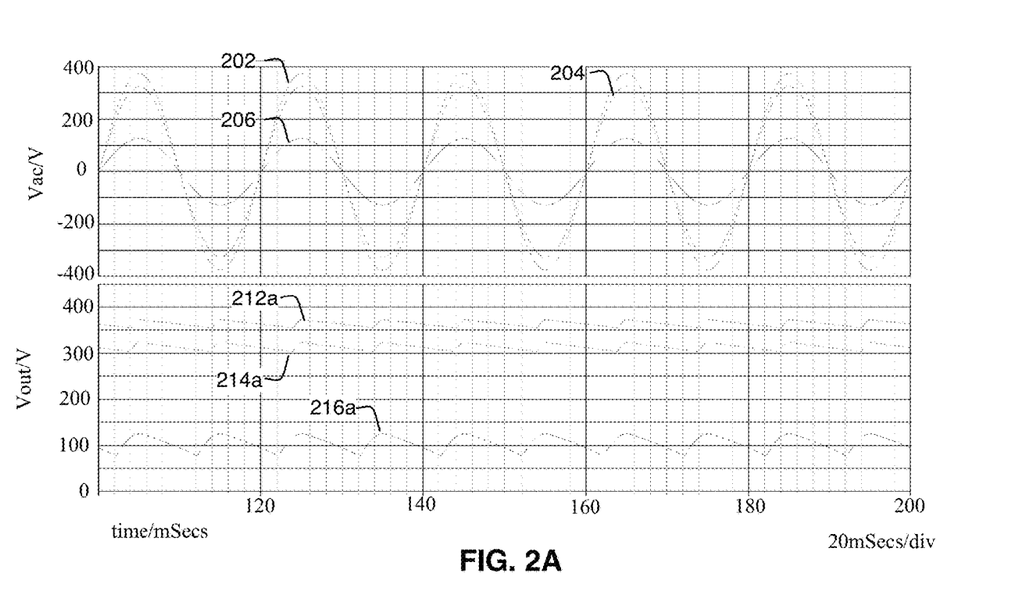
FIGS. 2A and 2B depict certain waveforms of an AC-DC converter with different DC bulk capacitor values.
Figure 2B:
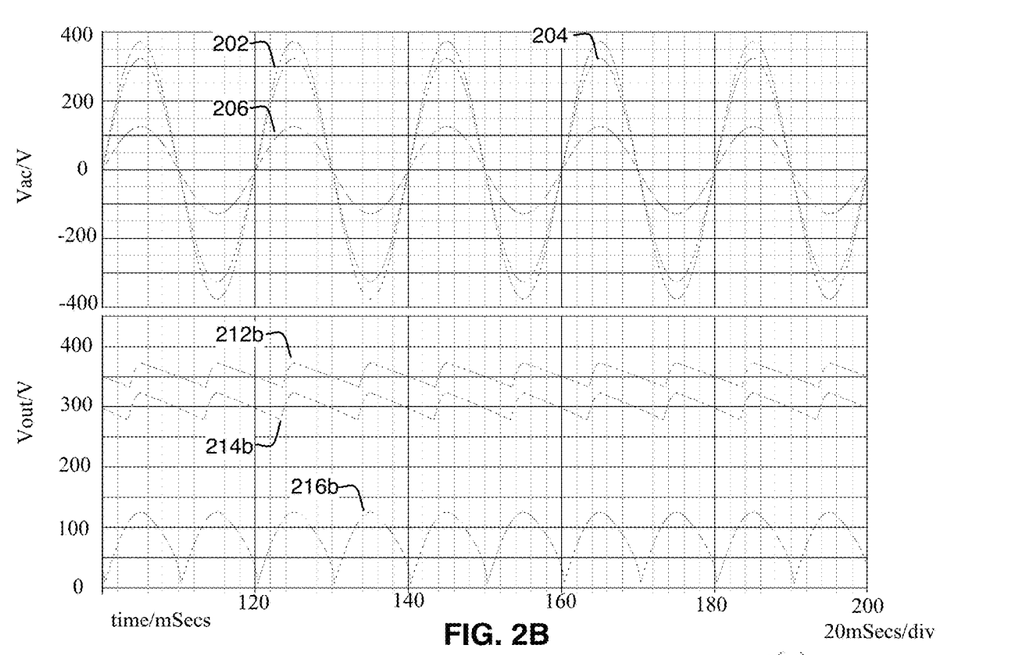

FIG. 2A illustrates a series of waveforms associated with converter 100 at different AC input voltages. More specifically, curves 202, 204, and 206 show input AC voltages of 265V, 230V, and 90V, respectively. FIG. 2 also shows DC bus voltages (Vdc), i.e., voltages across the DC bulk capacitor Cdc for these voltages for a converter operating at a fixed power level with a relatively larger capacitor value (vs. the waveforms discussed below with respect to FIG. 2B). Curve 212a illustrates the DC bus voltage corresponding to the 265 Vac input. Curve 214a illustrates the DC bus voltage corresponding to a 230 Vac input. Curve 216a illustrates the DC bus voltage corresponding to a 90 Vac input. As can be seen in the figures, as the input voltage decreases, the DC bus voltage decreases, and the magnitude of the voltage ripple on the DC bus increases.

FIG. 2B illustrates a series of waveforms associated with variation of converter 100 at the same input voltage. For the waveforms of FIG. 2B, converter 100 has been modified to have a smaller DC bulk capacitor Cdc. As in FIG. 2A, curves 202, 204, and 206 show input AC voltages of 265V, 230V, and 90V, respectively. Similarly to FIG. 2A, curve 212b illustrates the DC bus voltage corresponding to the 265 Vac input with reduced DC bus capacitance. Curve 214b illustrates the DC bus voltage corresponding to a 230 Vac input with reduced DC bus capacitance. Curve 216b illustrates the DC bus voltage corresponding to a 90 Vac input with reduced DC bus capacitance. As can be seen in the figures, the reduced DC bus capacitance slightly decreases the average value of the DC bus voltage and significantly increases the DC bus voltage ripple with very low minimum DC bus voltage Vdc.

Figure 3:
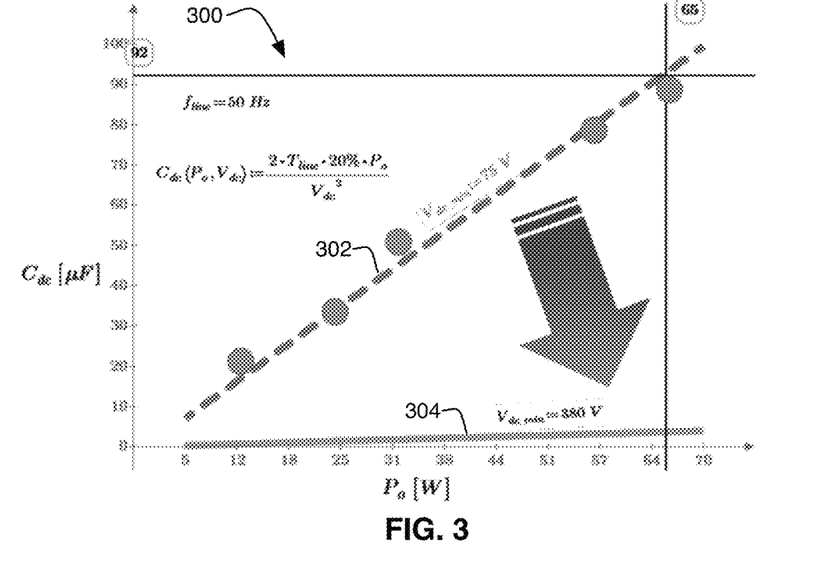
FIG. 3 depicts exemplary curves of required DC bulk capacitance values as a function of converter rated power for differing DC bus voltages.

FIG. 3 is a graph illustrating exemplary required capacitor values as a function of output power. For an exemplary converter design, the minimum DC voltage may be set to 70~80V, which provides a reasonable range of capacitor values, sizes, and other parameters of a typical implementation. The y-axis of FIG. 3 indicates the DC capacitor value in microfarads (uF), and the x-axis indicates the required output power level in watts. Curve 302 illustrates required capacitor values to provide a desired hold up time (corresponding to energy stored in the capacitor) at the minimum DC voltage of 75V. As can be seen, the capacitor size can increase relatively rapidly with increasing output power. Curve 304 illustrates required capacitor values to provide the same desired hold up time (corresponding to energy stored in the capacitor) at a minimum DC bus voltage of 380V. Because the energy stored in a capacitor is proportional to the square of the voltage, increasing the minimum DC bus voltage from 75V to 380V allows for much smaller capacitance values to be used.

Figure 4:
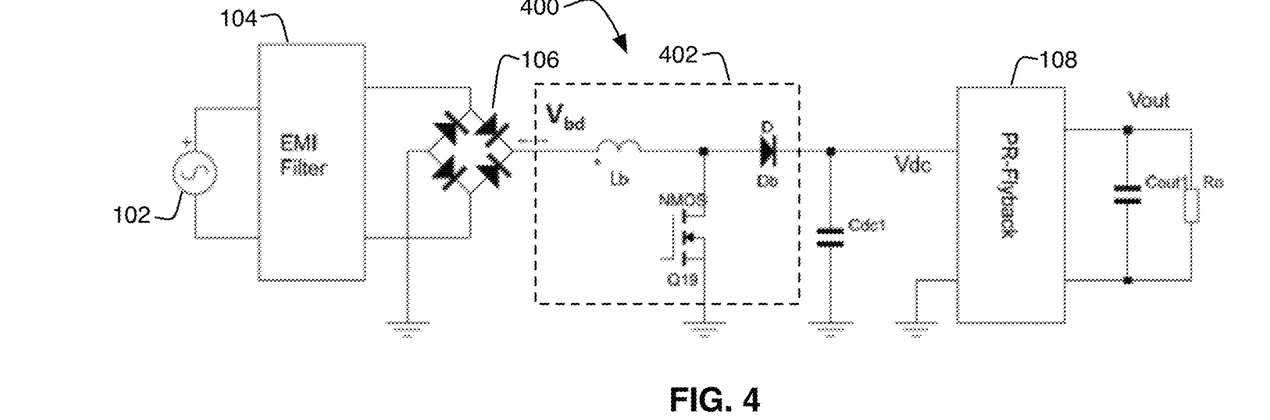
FIG. 4 illustrates an AC-DC converter incorporating a boost front end and flyback converter.

Thus, FIG. 4 illustrates an AC-DC converter 400 using a boost front end 402 to increase the DC bus voltage provided to the input of flyback converter stage 108. As with the converter of FIG. 1, an AC input voltage source 102 may be coupled to an EMI filter 104. The EMI filtered waveform may then be applied to a bridge rectifier 106. The full wave rectified sinusoidal voltage may then be applied to the input of boost converter 402. Boost converter 402 may be operated to increase the full wave rectified AC input voltage to a relatively constant desired DC bus voltage. For low line voltage conditions (e.g., an input voltage in the range of 90 Vac), boost converter may be operated with a relatively high voltage gain to produce a DC bus voltage Vdc of about 375 Vdc. For high line voltage conditions (e.g., an input voltage in the range of 265 Vac), boost converter 402 may be operated with a relatively small voltage gain to produce about the same DC bus voltage Vdc of about 375 Vdc. It will be appreciated that other input voltages and/or DC bus voltages may be used depending on the particulars of a given embodiment. It will further be appreciated that because the output of boost stage 402 is the input to another conversion stage (i.e., flyback stage 108), it is not necessary for boost stage 402 to provide very tight regulation, as small variations in DC bus voltage Vdc may be compensated for by the controller of flyback stage 108.

The output voltage of boost stage 402 may be applied across DC bulk capacitor Cdc1. As discussed herein, this capacitor may have a relatively smaller capacitance value, and thus physical size, as compared to capacitors used in converters according to the prior art. As with converter 100, DC bus voltage Vdc is provided to the input of flyback stage 108, which may then operate to convert the DC bus voltage into the required output voltage Vout.

Figure 5A:
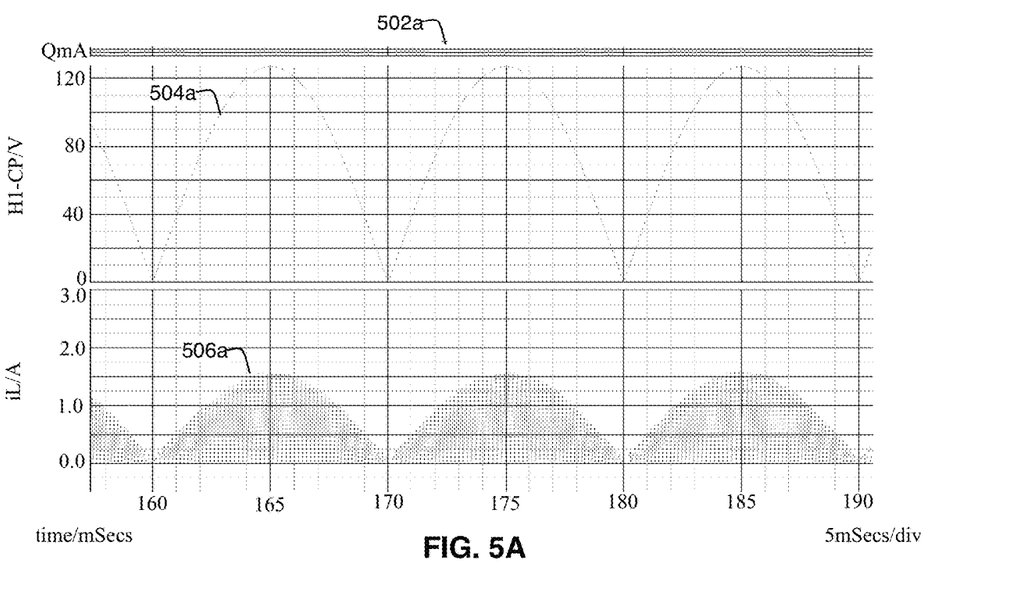
FIGS. 5A and 5B depict certain waveforms of AC-DC of a boost converter front end.

Boost converter front end stages have previously been used in conjunction with other converters to provide power factor correction. Power factor correction may be provided (and in some instances is required) for converters with power ratings above about 65 W. FIG. 5A illustrates an operating scheme for a boost converter front end stage used for power factor correction. Pulses 502a illustrate the switching timing of the boost converter switch. Waveform 504a illustrates the rectified sinusoidal input voltage the boost converter receives. Waveform 506a illustrates the current waveform, which consists of a series of narrow triangular current pulses corresponding to the switching of the boost converter switch, following a sinusoidal current envelope. As the sinusoidal current envelope is in phase with the input voltage, the power factor seen by the AC input source is 1.0.

Figure 5B:
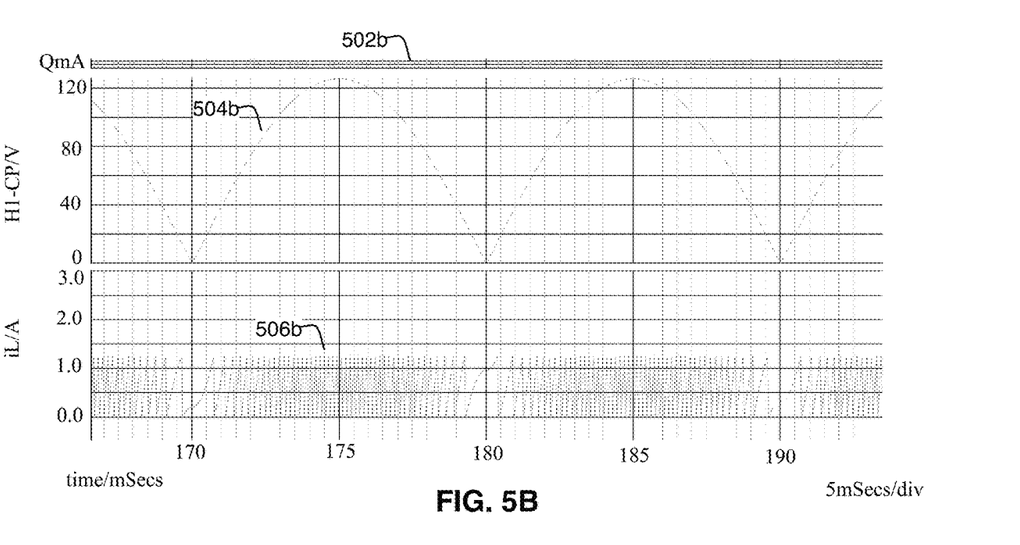

FIG. 5B illustrates an alternative switching scheme for the boost converter front end that may be used in conjunction with some embodiments of the present invention. Rectified AC input voltage 504b may be effectively the same as in the PFC case depicted in FIG. 5A. However, the switching duty cycle of the boost converter stage is controlled substantially differently (as discussed in greater detail below). Current waveform 506b illustrates that the peak current through the inductor is relatively constant. The boost converter switch is operated to maintain this constant peak inductor current, and thus provides more boost near the zeroes of the AC input voltage and less boost near the peaks of the input voltage, thereby maintaining a fairly constant and relatively higher voltage across the DC voltage bus that is the input into the flyback converter.

Figure 6:
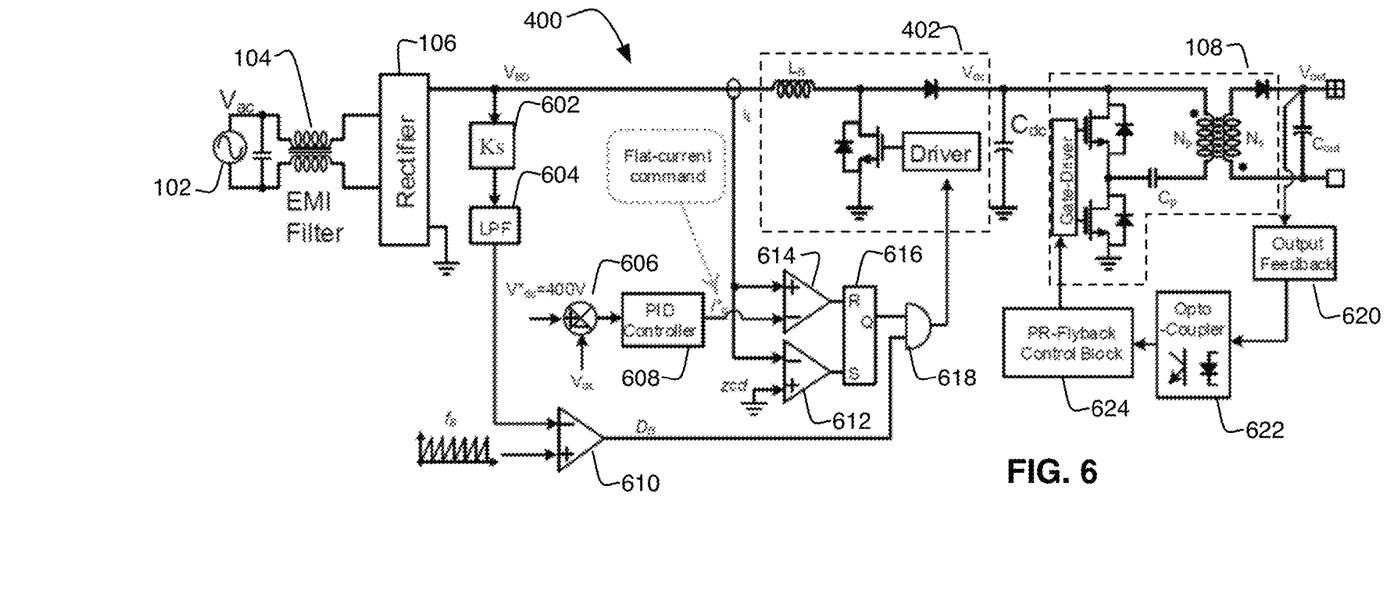
FIG. 6 illustrates control circuitry for an AC-DC converter incorporating a boost front end and flyback converter.

FIG. 6 illustrates AC-DC converter 400 using a boost front end 402 to increase the DC bus voltage provided to the input of flyback converter stage 108. FIG. 6 further shows the proposed flat-current active blanking (FCAB) control block diagram that produces the input current introduced above with respect to FIG. 5B. The control system includes an outer voltage control loop, with an inner control controlling the CrM (Critical conduction Mode) current mode operation. Details of the control system are explained in greater detail below, but at a high level current through boost inductor Lb is controlled to have a relatively constant (flat) average value over the AC line cycle, with the peak current value being determined by the outer voltage control loop.

Additionally, there may optionally be an active-blanking period that is controlled by the amplitude of the rectified input voltage, VBD. More specifically, a higher rectified input voltage VBD may cause a longer OFF blanking time period, while a lower rectified input voltage VBD may cause a shorter blanking time period. Blanking time period control responsive to the AC input voltage can allow the peak inductor current to be substantially similar for both high input line voltages and lower input line voltages. This, in turn, can allow for a lower number of switching events over one AC line cycle at a high input voltage versus a higher number of switching events over one AC line cycle at a lower input voltage. Fewer switching cycles at higher line voltages may improve converter efficiency by reducing switching losses associated with the longer turn off time of the boost switch at higher line voltages.

As illustrated in FIG. 6, summer 606 receives a feedback signal VDC that corresponds to the output of boost converter 402, which is also the DC bus voltage across capacitor Cdc and the input voltage into flyback converter 108. This feedback signal may be subtracted from a DC bus reference voltage (e.g., 400 Vdc) to generate an error signal that may be provided to controller 608. In the illustrated embodiment, controller 608 is a PID (proportional-integral-derivative) controller. Although a PID controller may be appropriate for many embodiments, other controller types, such as proportional, proportional or integral converters could also be used. Controller 608 outputs a flat current command i*c, which may be provided to a first comparator 614. Comparator 614 may receive at its other input a signal corresponding to the current iL through boost inductor LB. The output of comparator 614 may be provided to the reset input of flip flop 616. A second comparator 612, configured as a zero crossing detector by grounding its non-inverting input, may also receive the current iL through boost inductor LB. The output of the zero crossing detector comparator 612 may be coupled to the set input of flip flop 616.

As a result, when the inductor current iL reaches zero, flip flop 616 will be toggled ON. Assuming the active blanking circuitry is either absent or has enabled switching of the boost converter switch (discussed further below), flip flop 616 can thus trigger a driver of the boost switch in boost converter 402. Turning on the boost switch can allow an increasing current iL to flow through boost inductor LB, until iL reaches the value of the flat current command i*c generated by DC bus voltage controller 608. Once inductor current iL peaks at i*c, the output of comparator 614 goes high, resetting flip flop 616, which triggers the boost switch driver to turn off the boost switch. This causes inductor current iL through boost inductor LB to decay. Once the boost inductor current reaches zero, the cycle repeats (again assuming the active blanking circuit remains enabled). Thus, boost converter 402 is operated in the critical conduction mode.

The aforementioned description of the flat current control loop is but one implementation. It will be appreciated that the functions described above may be implemented in a variety of ways, including analog circuitry, digital circuitry, hybrid analog/digital circuitry, programmed microcontrollers or other processors, application specific integrated circuits (ASICs), and the like. Additionally, variations in the exact control functions applied may also be implemented while still maintaining the operating principles discussed above.

The optional but advantageous active blanking control circuit receives as an input VBD, i.e., the rectified AC input voltage appearing at the output of bridge rectifier 106. This voltage may be scaled by a suitable gain element 602 and may also be subjected to a low pass filter 604. The optionally scaled and filtered rectified input voltage may be applied to one input of a comparator 610, which may receive at its other input a ramp signal III Comparator 610 thus acts something like a pulse width modulation (PWM) comparator and produces an output signal DB that may be provided to an input of AND gate 618, which receives the output of flip flop 616 discussed above. In general, lower rectified input voltage values will result in longer ON period (a shorter blanking period) and higher rectified input voltage values will result in a shorter ON period (a longer blanking period). As discussed above, blanking time period control responsive to the AC input voltage can allow the peak inductor current to be substantially similar for both high input line voltages and lower input line voltages, which may ultimately result in higher operating efficiency, particularly at higher input voltages. The aforementioned active blanking circuitry may be optionally included or omitted depending on the performance requirements of a particular embodiment.

The aforementioned description of the active blanking control loop is but one implementation. It will be appreciated that the functions described above may be implemented in a variety of ways, including analog circuitry, digital circuitry, hybrid analog/digital circuitry, programmed microcontrollers or other processors, application specific integrated circuits (ASICs), and the like. Additionally, variations in the exact control functions applied may also be implemented while still maintaining the operating principles discussed above.

With further reference to FIG. 6, boost converter output voltage Vdc may be provided as an input voltage to flyback converter 108. The intermediate DC bus may be supported by a capacitor Cdc. As discussed above, using boost converter 402 to provide a relatively constant Vdc over a wide range of input voltages can allow Cdc to have a smaller capacitance value (and thus smaller size) while still providing adequate energy storage over a wide range of input voltages. In some embodiments, the reduced capacitance value may also allow for different capacitor types to be used. For example, rather than electrolytic capacitors, metal film capacitors may be used, which can improve reliability and longevity of the converter.

Flyback converter 108 may regulate the DC bus voltage Vdc to the desired low output voltage level Vout. In some embodiments, flyback converter 108 may be a primary resonant flyback converter (including resonant capacitor Cp) and the associated switching devices. In other embodiments other flyback converter types, including those with active or passive clamps may be employed. In the illustrated embodiment, flyback converter 108 may be controlled by a feedback loop that receives the output voltage Vout into an output feedback circuit 620. This output feedback signal may be provided to a controller 624 on the primary side that operates the switching devices. To provide isolation between the load and the input power, flyback converter output feedback may be coupled back may be provided to the primary side control loop by an optocoupler 602. In other embodiments, an instrument transformer could be used in place of the optocoupler, an auxiliary winding of the flyback transformer could be used, or primary side sensing of the output voltage could also be employed. These and any other variations of flyback converter control may be advantageously employed with the flat current active blanking boost front end circuit described above. Furthermore, although described in conjunction with a flyback converter, other converter topologies could be employed for the second stage, including buck converters, boost converters, buck-boost converters, forward converters, resonant converters, etc.

Figure 7A:
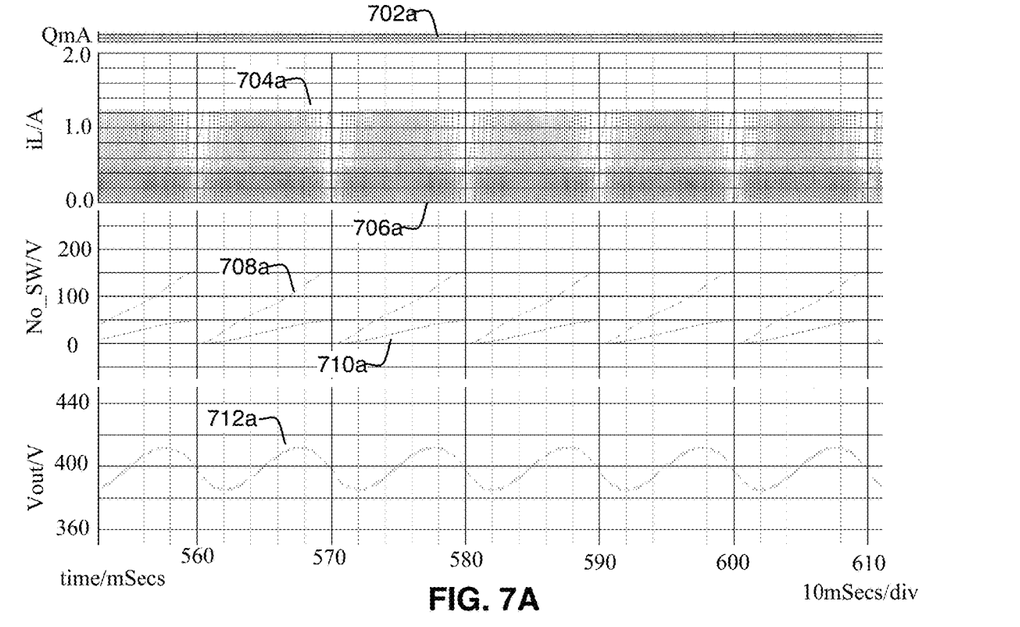
FIGS. 7A & 7B illustrate certain waveforms of an AC-DC converter incorporating a boost front end and flyback converter.
Figure 7B:
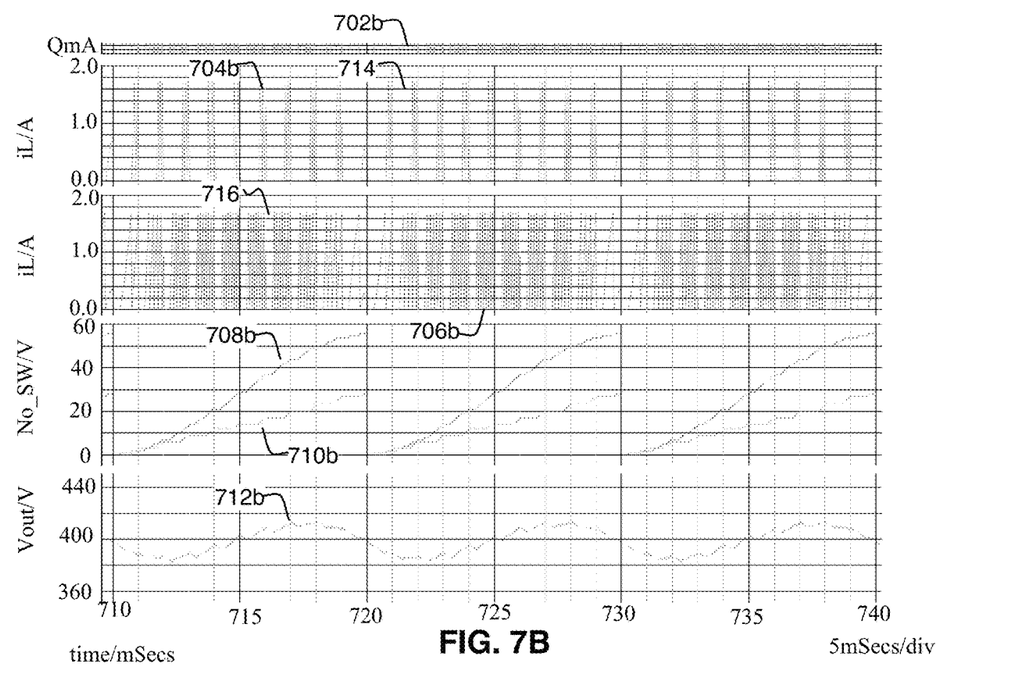

FIGS. 7A and 7B illustrate various waveforms of an FCAB boost front AC-DC converter as discussed above with reference to FIGS. 4 and 6. FIG. 7A shows the inductor currents with flat current control, without the optional active-blanking circuitry. Waveform 702a illustrates the switching gate pulses of the boost converter switch. Current waveform 704a illustrates the inductor current at a low input line voltage, while current waveform 706a illustrates the inductor current at a high input line voltage. Curve 708a illustrates the cumulative number of boost switch switching cycles for a high line voltage condition, and curve 710a illustrates a cumulative number of boost switch switching cycles for each input cycle of the rectified AC input waveform when a low line voltage is applied to the input. As can be seen, substantially higher number of switching cycles may be required during high line voltage conditions if active blanking is not employed. Finally, waveform 712a illustrates the DC bus voltage (and associated ripple) appearing at the output of the boost converter, across the DC bus capacitor, and at the input of the flyback converter.

FIG. 7B shows the inductor currents with the shows the simulation result with optional active blanking interval (i.e., flat current active blanking "FCAB" operation). Waveform 702b illustrates the switching gate pulses of the boost converter switch. Current waveform 704b illustrates the inductor current at a high input line voltage, including blanking intervals 714, during which no switching occurs. Current waveform 706b illustrates the inductor current at a low input line voltage, including blanking intervals 716, during which no switching occurs. As can be seen the peak currents both at low and high lines are almost the same or similar with employing the active-blanking scheme. Curve 708*b* illustrates the cumulative number of boost switch switching cycles for a low line voltage condition, and curve 710*b* illustrates a cumulative number of boost switch switching cycles for each input cycle of the rectified AC input waveform when a high line voltage is applied to the input. As can be seen, a substantially lower number of switching cycles may be required during high line voltage conditions if active blanking is employed. Finally, waveform 712*b* illustrates the DC bus voltage (and associated ripple) appearing at the output of the boost converter, across the DC bus capacitor, and at the input of the flyback converter.

Figure 8:
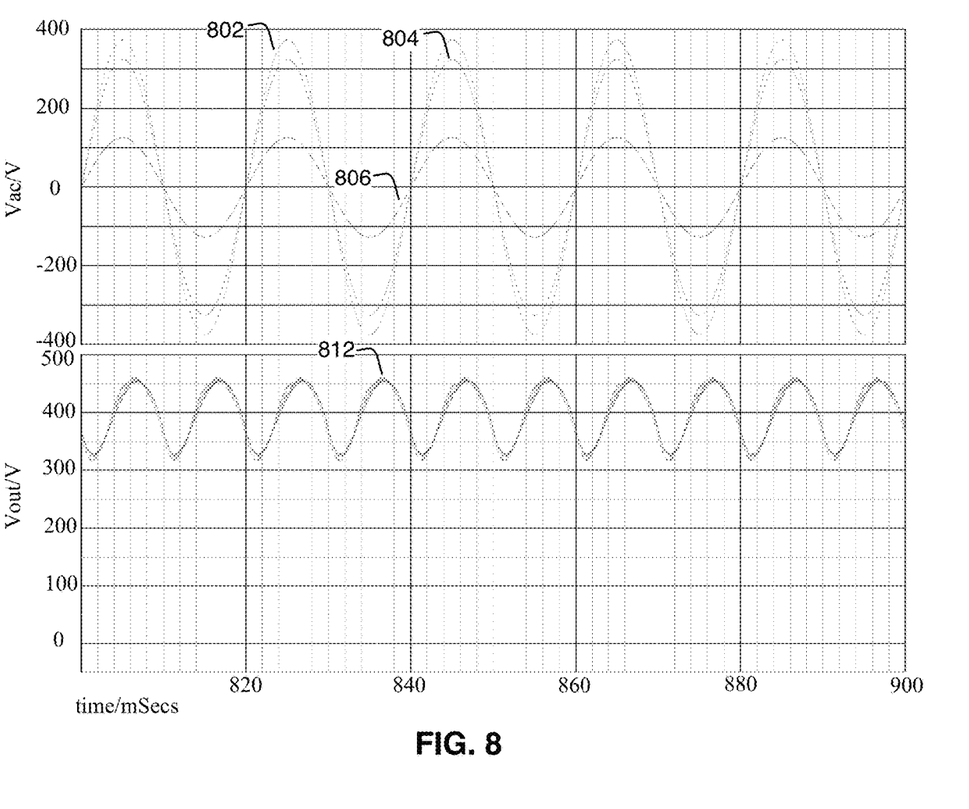
FIG. 8 illustrates certain waveforms of an AC-DC converter incorporating a boost front end and flyback converter.

FIG. 8 corresponds generally to FIGS. 2A & 2 and illustrates shows output ripple voltages for a FCAB converter as described above with an output capacitor much smaller (more than one order of magnitude) than in the figures above. Input voltages 802, 804, and 806 correspond to AC input voltages of 265V, 230V, and 90V respectively. By virtue of the FCAB boost front end, ripple voltages 812 are essentially the same for all input voltage instances and are substantially reduced. The remaining ripple may be compensated for by duty cycle control of the flyback stage 108.

Figure 9:
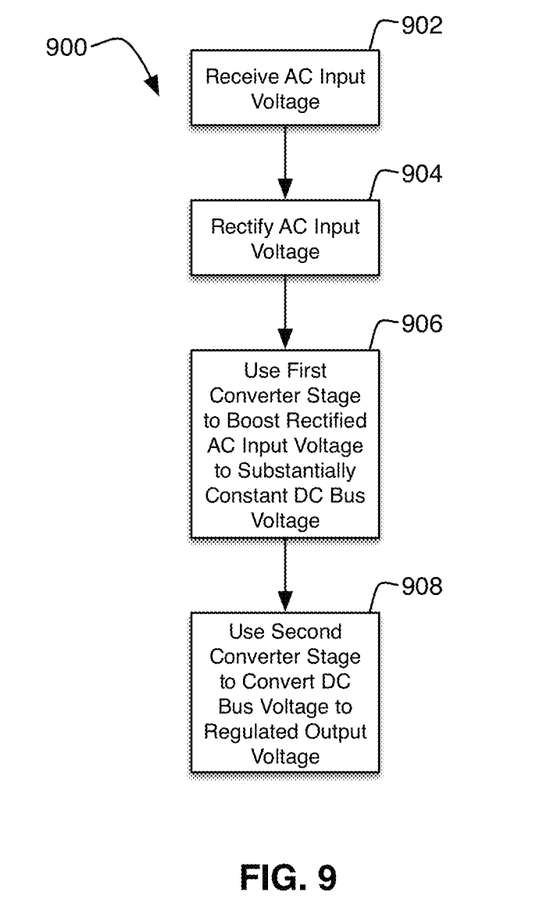
FIG. 9 illustrates a flowchart 900 depicting a method of producing a regulated DC output voltage from an AC input voltage.

FIG. 9 illustrates a flowchart 900 depicting a method of producing a regulated DC output voltage from an AC input voltage. The method can include receiving an AC input voltage (block 902) and rectifying the AC input voltage (block 904). Rectification of the AC input voltage may be performed using a diode bridge rectifier as described above or using any other suitable configuration of active and/or passive components that can generate a rectified voltage from the AC input. In block 906, a first switching converter stage may be employed to boost the rectified AC input voltage to a DC bus voltage that is substantially constant over a broad range of input voltages.

The first switching converter stage may be a boost converter front end as described above. The substantially constant DC bus voltage may, for example, be a DC bus voltage that varies by less than 20% over a 3:1 input voltage range. For example, the DC bus voltage may exhibit a ripple of 50-75V around an average value of about 400V for input voltages ranging from about 90 Vac to 265 Vac as illustrated in FIG. 8. Other applications may require other levels of constancy with respect to the DC bus voltage over wider or smaller ranges of input voltage. One factor for determining whether a DC bus voltage is sufficiently substantially constant over an AC input voltage range is whether a required level of energy storage in a DC bus capacitor of a desired size is possible over the range of DC bus and AC input voltages.

With continued reference to FIG. 9, in block 908 a second switching converter stage may be used to convert the DC bus voltage to a regulated output voltage. The second switching converter stage may be a flyback converter or other suitable converter type discussed above. The flyback converter may be a primary resonant flyback converter.

Described above are various features and embodiments relating to AC-DC converters with a boost front end having flat current and optionally active blanking control. Such circuits may be used in a variety of applications but may be particularly advantageous when used in conjunction with AC-DC converters/adapters (colloquially known as chargers or external power bricks) for portable electronic devices, small form factor computers, and the like. Additionally, although numerous specific features and various embodiments have been described, it is to be understood that, unless otherwise noted as being mutually exclusive, the various features and embodiments may be combined various permutations in a particular implementation. Thus, the various embodiments described above are provided by way of illustration only and should not be constructed to limit the scope of the disclosure. Various modifications and changes can be made to the principles and embodiments herein without departing from the scope of the disclosure and without departing from the scope of the claims.

The invention claimed is:

1. A power converter comprising:
   an input boost converter stage having an input configured to receive a rectified AC input voltage and an output configured to deliver a DC bus voltage; and
   a second switching converter stage having an input configured to receive the DC bus voltage and an output configured to deliver a regulated output voltage;
   wherein the input boost converter is configured to be operated in a flat current mode to maintain a substantially constant DC bus voltage over a broad range of AC input voltages, wherein a flat current corresponding to the flat current mode is determined responsive at least in part the DC bus voltage and a current flowing through an inductor of the boost converter.

2. The power converter of claim 1 wherein the input boost converter is further configured to be operated in an active blanking mode, wherein operation of the boost converter is prevented during a controlled blanking interval of each cycle of the rectified AC input voltage.

3. The power converter of claim 2 wherein the blanking interval is increased responsive at least in part due to an increase in the AC input voltage.

4. The power converter of claim 2 wherein the blanking interval is decreased responsive at least in part due to a decrease in the AC input voltage.

5. The power converter of claim 1 wherein the second switching converter is a flyback converter.

6. The power converter of claim 5 wherein the flyback converter is a primary resonant flyback converter.

7. The power converter of claim 1 wherein the broad range of AC input voltages spans from a low line voltage to a high line voltage that is approximately three times a low line voltage.

8. The power converter of claim 7 wherein the broad range of AC input voltages is from about 90V to about 265V.

9. A power converter comprising:
   a boost converter front end configured to convert a rectified AC input voltage into a DC bus voltage;
   a first control loop coupled to the boost converter front end and configured to operate a switch of the boost converter to maintain a flat inductor current through the boost converter and a substantially constant DC bus voltage over a range of AC input voltages, wherein the first control loop includes a controller configured to receive an error signal corresponding to a difference between the DC bus voltage and a voltage reference and to generate a flat current command responsive thereto;
   a second switching converter stage configured to convert the DC bus voltage to a regulated output voltage;
   a second control loop coupled to and configured to operate the second switching converter stage.

10. The power converter of claim 9 wherein the controller is a PID controller.

11. The power converter of claim 9 wherein the first control loop includes a comparator configured to compare the flat current command to an inductor current of the boost converter front end and a zero crossing detector configured to detect a zero of the inductor current of the boost converter, wherein the zero crossing detector is configured to turn on a switch of the boost converter front end, and the comparator is configured to turn off the switch of the boost converter end.

12. The power converter of claim 11 wherein the first control loop includes a controller configured to selectively enable switching of the boost converter switch responsive to the rectified AC input voltage.

13. The power converter of claim 12 wherein the controller configured to selectively enable switching of the boost converter is configured to compare the rectified AC input voltage to a ramp signal.

14. The power converter of claim 9 wherein the first control loop is implemented using analog circuitry.

15. The power converter of claim 9 wherein the first control loop is implemented using a programmed controller.

16. The power converter of claim 9 wherein the first control loop is implemented using an application specific integrated circuit.

17. The power converter of claim 9 wherein a broad range of AC input voltages spans from a low line voltage to a high line voltage that is approximately three times a low line voltage.

18. The power converter of claim 17 wherein the broad range of AC input voltages is from about 90V to about 265V.

19. A method of converting an AC input voltage into a regulated DC voltage, the method comprising:
    receiving the AC input voltage;
    rectifying the AC input voltage into a rectified AC input voltage;
    using a first switching converter stage to convert the rectified AC input voltage into a DC bus voltage that is substantially constant over a broad range of AC input voltages by operating the first switching converter stage in a flat current mode, wherein a flat current corresponding to the flat current mode is determined responsive at least in part the rectified AC input voltage and a current flowing through an inductor of the first switching converter stage;
    using a second switching converter stage to convert the DC bus voltage to the regulated output voltage.

20. The method of claim 19 wherein the broad range of AC input voltages spans from a low line voltage to a high line voltage that is approximately three times a low line voltage.

21. The method of claim 20 wherein the broad range of AC input voltages is from about 90V to about 265V.

22. The method of claim 19 wherein the first switching converter stage is a boost converter.

23. The method of claim 19 wherein the first switching converter stage employs active blanking, wherein operation of the first switching converter stage is prevented during a controlled blanking interval of each cycle of the rectified AC input voltage.

24. The method of claim 23 wherein the blanking interval is increased responsive at least in part due to an increase in the AC input voltage.

25. The method of claim 24 wherein the blanking interval is decreased responsive at least in part due to a decrease in the AC input voltage.

* * * * *